United States Patent [19]
Ishikawa et al.

[11] Patent Number: 5,444,683
[45] Date of Patent: Aug. 22, 1995

[54] OPTICAL REPORTING REPRODUCING DEVICE HAVING FIXED AND MOVABLE OPTICAL SYSTEMS

[75] Inventors: Hiroyuki Ishikawa; Shinji Haba; Kouichi Ebina; Takashi Takeda; Hirokazu Ito; Hideya Seki, all of Suwa, Japan

[73] Assignee: Seiko Epson Corporation, Tokyo, Japan

[21] Appl. No.: 186,237

[22] Filed: Jan. 25, 1994

Related U.S. Application Data

[63] Continuation of Ser. No. 704,150, May 22, 1991, abandoned.

[30] Foreign Application Priority Data

| | | | |
|---|---|---|---|
| May 24, 1990 | [JP] | Japan | 2-134651 |
| Jun. 6, 1990 | [JP] | Japan | 2-148092 |
| Aug. 24, 1990 | [JP] | Japan | 2-223812 |
| Feb. 14, 1991 | [JP] | Japan | 3-020886 |
| May 7, 1991 | [JP] | Japan | 3-101239 |

[51] Int. Cl.[6] .............................. G11B 7/00
[52] U.S. Cl. ........................ 369/44.28; 369/112; 369/44.32; 369/44.17; 369/119
[58] Field of Search ............ 369/44.11, 44.13, 44.15, 369/44.21, 44.22, 44.32, 44.23, 44.24, 44.17, 114, 115, 116, 119

[56] References Cited

U.S. PATENT DOCUMENTS

| | | | |
|---|---|---|---|
| 4,268,129 | 5/1981 | Araki | 369/119 |
| 4,564,757 | 1/1986 | LaBudde et al. | 369/44.14 |
| 4,719,614 | 1/1988 | Leterme et al. | 369/44.14 |
| 4,744,071 | 5/1988 | Bricot et al. | 369/44.23 |
| 4,768,180 | 8/1988 | Janssen et al. | 369/44.32 |
| 4,782,474 | 11/1988 | Arai et al. | 369/44.14 |
| 4,799,206 | 1/1989 | Imanaka | 369/44.21 |
| 5,131,744 | 7/1992 | Kaneko et al. | 356/138 |
| 5,140,572 | 8/1992 | Kibune et al. | 369/44.14 |

FOREIGN PATENT DOCUMENTS

| | | | |
|---|---|---|---|
| 55646 | 7/1982 | European Pat. Off. | 369/44.21 |
| 61-182640 | 8/1986 | Japan | 369/44.14 |
| 61-194647 | 8/1986 | Japan | 369/44.32 |
| 63-53725 | 3/1988 | Japan | 369/44.32 |
| 2-189731 | 7/1990 | Japan | 369/44.21 |
| 362014 | 3/1991 | Japan | 369/44.21 |

Primary Examiner—Georgia Y. Epps
Assistant Examiner—Nabil Hindi
Attorney, Agent, or Firm—Sughrue, Mion, Zinn, Macpeak & Seas

[57] ABSTRACT

An optical record reproducing device including a movable optical system for moving along a radial direction of an optical disc, a separated optical system including a light source and a separated fixed optical system, a tracking control system having a reflective mirror for reflecting a laser beam irradiated from the light source toward the movable optical system and an accurate angular displacement mechanism including an angular displacement detector for directly detecting an angular displacement of the reflective mirror so as to control the movable optical system accuarately.

2 Claims, 20 Drawing Sheets

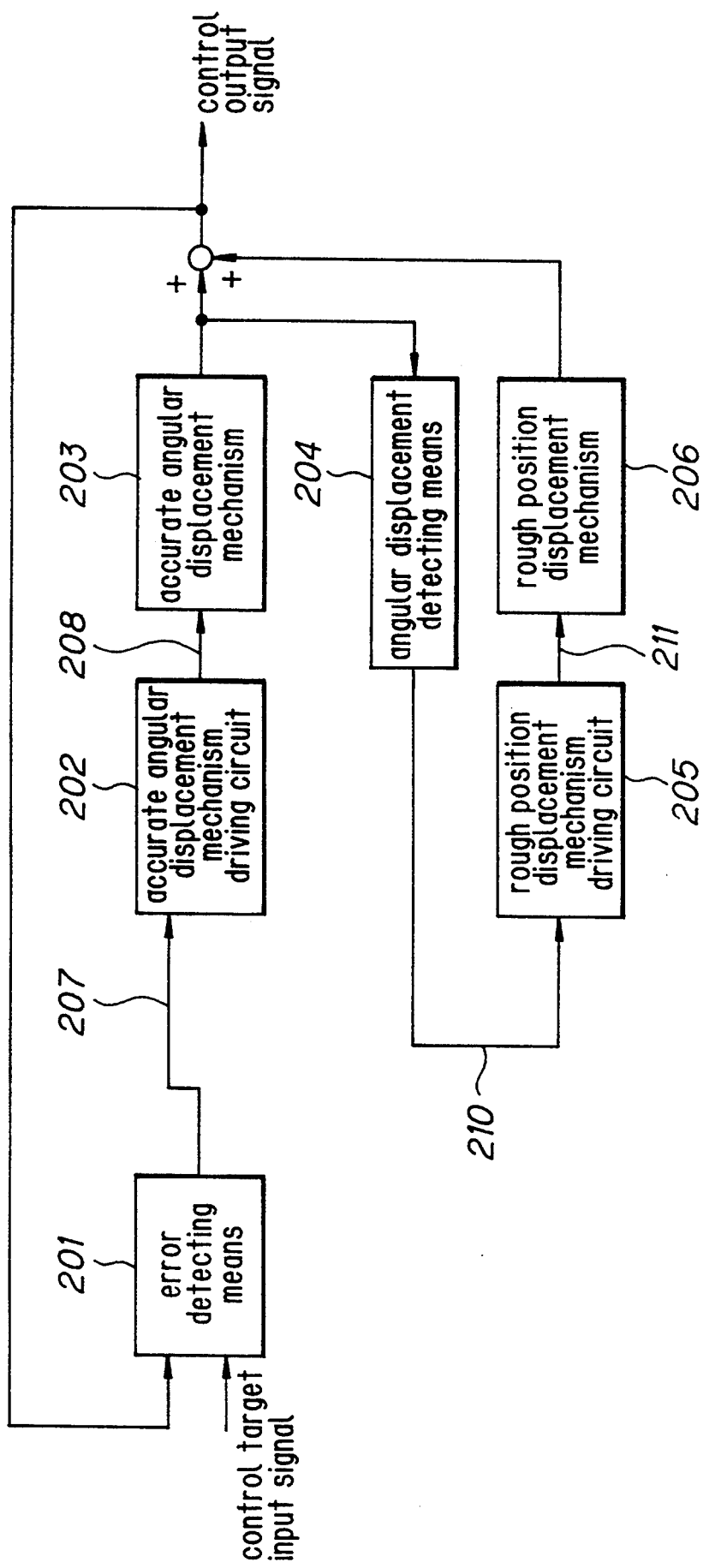

OPTICAL REPORTING REPRODUCING DEVICE HAVING FIXED AND MOVABLE OPTICAL SYSTEMS

This is a continuation of application Ser. No. 07/704,150 filed May 22, 1991, now abandoned.

BACKGROUND OF THE INVENTION

The present invention relates to a field of optical record reproducing, particularly to an optical record reproducing device having a separated optical system.

FIG. 22 shows one of embodiments of a conventional optical record reproducing device. As shown in the drawing, in the optical record reproducing device, although a movable optical system 102, capable of moving a radial direction C of an optical disc, 109 such as a photomagnetic disc employs an objective lens 108 and a reflective mirror 107, a light source (not shown) is excluded. The light source and a reflective mirror 101 are located at a fixed position with respect to the optical disc 109. Accordingly, a laser beam irradiated from the light source is reflected at the reflective mirror 101 and introduced to the reflective mirror 107 and the objective lens 108 in the optical system 102. In this embodiment, prisms are used as the reflective mirrors 101, 107 and the beam is totally reflected by the prisms.

In the embodiment, an angle of the reflective mirror 101 is accurately displaced by a tracking actuator (not shown). That is, the reflective mirror 101 is held with a holder 101a and the holder 101a can be inclined or pivoted with respect to a rotational direction E of which a central axis is in a direction A parallel to the irradiated light beam from the light source by a supporting mechanism. An accurate angle displacement mechanism for accurately displacing an angle of the holder 101a and the reflective mirror 101 a predetermined degree along the rotational direction E is utilized as a tracking actuator. Generally, a reflective mirror for displacing angle accurately is called as a galvanomirror. In the present invention, such a reflective mirror is called as the galvanomirror.

One embodiment of a supporting mechanism of the galvanomirror is shown in FIGS. 23(a) and 23(b). As shown in the drawings, a metal plate 113 is mounted on a substrate 112 and a rubber supporting member 114 is attached at an upper end of the metal plate 113. The galvanomirror 115 is a plate-shaped reflective mirror. At both sides of the supporting member 114, a coil 116 is located, respectively and a magnet 117 is located outside of each coil 116 with a predetermined interval. The accurate angle displacement mechanism is constituted by these coils 116 and magnets 117. Accordingly, when predetermined electric magnetic force is applied to a space between the coil 116 and the magnet 117 by conducting the coil 116, the supporting member 114 and the galvanomirror 115 are pivotally inclined on a portion engaging with the metal plate 113. Accordingly, a laser beam irradiated from the galvanomirror 115 is moved by driving the accurate angle displacement mechanism so as to displace the angle of the galvanomirror accurately.

Accordingly, in the optical record reproducing device as shown in FIG. 22, a laser beam 103 irradiated from a light source such as a semiconductor laser and so on is irradiated on the galvanomirror from a direction of an arrow A and the laser 101 is reflected toward a direction of an arrow B as a reflected laser beam 104. The laser beam 104 is reflected by the reflective mirror 107 in the movable optical system 102 and returned toward a direction of an arror D as a laser beam 105 and the laser beam 105 is condensed by the objective lens 108 and a light spot 111 is formed on an optical disc 109 so as to be utilized for optical record reproducing. A location of the light spot 111 is slightly displaced in a range of less than several hundreds μm by accurately displacing an angle of the galvanomirror 101 and a reflective direction of the laser beam 104 so as to operate a tracking control for controlling the location of the light spot corresponding to a track 110.

As described above, a separated optical system in which a movable optical system 102, including the objective lens 108, and a fixed optical system including the light source, are separated from each other has a tracking actuator in the fixed optical system so that the weight of the movable optical system is relative low and the moving speed is attendantly increased.

On the other hand, the movable optical system 102 is linearly moved along a radius direction C of the optical disc 109 by a seeking actuator. A rough position displacement mechanism for linearly displacing the movable optical system along the radius direction within a range of several tens mm is used as the seeking actuator so as to search tracks from the innermost track to the outermost track of the optical disc 109. For example, a voice coil motor (hereinafter it is called as "VCM") is used as the rough position displacement mechanism.

In the optical record reproducing device as shown in FIG. 22, although the accurate angle displacement mechanism, that is, the tracking actuator is employed as a tracking control for controlling a light spot 11 corresponding to a track 110, if the light spot 111 is disposed outwardly or inwardly from the track 110 a relatively large amount, there is a limit in regard to the ability of the light spot to be moved by the accurate angle displacement mechanism alone.

Therefore, it has been developed a tracking control system by combining the accurate angle displacement mechanism and a rough position displacement mechanism so as to increase a follow-up control of the light spot 111 in tracking control. For example, a tracking control system comprises the accurate angle displacement mechanism and the rough position displacement mechanism which are connected in parallel. A respective detecting signal from an error detecting means (hereinafter, it is called as "a tracking error signal") is divided by a signal distributor and distributed to the accurate angle displacement mechanism and the rough position displacement mechanism. And, a tracking error signal is directly applied to the accurate angle displacement mechanism and a signal, which is a filter processed tracking error signal by an equivalent filter of the accurate angle displacement mechanism, is applied to the rough position displacement mechanism, so that a controlable region of a displacement is equivalent of a region of the control system divided by dependent connection.

In the tracking control, the accurate angle displacement mechanism and the rough location displacement mechanism are dependently connected via a signal transmitting means, the follow-up control is increased and there is a merit of reducing a sliding amount from an optical axis. Hereinafter, such a control system is referred to as a two-stage tracking control.

In the conventional optical record reproducing device as shown in FIG. 22, the direction C of moving the movable optical system 102 and the reflective direction B at a mechanically neutral point in the rotational direction of the galvanomirror 101 have to be parallel each other.

However, in prior art, there is no means for directly detecting an angle displacement of the galvanomirror 101. Therefore, the device is constructed by parts which are produced accurately with high attention so as to prevent the direction C of moving the movable optical system 102 from not being parallel to the reflective direction B of the galvanomirror 101 at the neutral point due to dispersion of used parts of the galvanomirror 101 and others and control error and to locate the direction C strictly parallel to the reflective direction B.

However, there is a limit for producing the parts and controlling accurately, so that it is difficult to locate the moving direction C strictly parallel to the reflective direction B and it generally results in angular error 0. By ocurring the angular error 0, the laser beam is outwardly shifted from a center line of the objective lens and a on-track condition is started while the laser beam is inclined or slided with respect to the optical disc 109.

Therefore, even if the tracking error signal is zero, the center line of the objective lens is in an off-set condition. Even if a tracking control for the optical disc 109 is operated, a light spot condensed by the movable optical system is not located at a center line of a track. In addition, while information is read, crosstalk occurs. While information is written, the writing is not done at a correct position. After producing the device, the angular error 0 becomes large, since a respective part is influenced by enviromental change and spending time, so that the problem becomes more serious.

In the supporting mechanism of the conventional galvanomirror as shown in FIGS. 23(a) and 23(b), rubber material is used as the supporting member 114. The supporting member has a low hold-rigidity for directions except a direction for rotating the galvanomirror 101 and the supporting member is easily influenced by dispersion and resonance frequency of the supporting member is low so that a control performance of the galvanomirror is reduced.

In the conventional tracking control system, a feed back control is operated by a tracking error signal only and it is necessary to use a filter which is equivalent to the filter of the signal distributor and the accurate angular displacement device, so that structure of a circuit becomes complete. Further, a characteristic of a whole control is determined by natural resonance frequency of the accurate angular displacement mechanism and the rough position displacement mechanism. Therefore, it is a subject to control the characteristic of the whole circuit without adjusting the natural resonance frequency of the accurate angular displacement mechanism and the rough position displacement mechanism.

In addition, in the two-stage tracking control, it is impossible for a method for two-stage tracking control by only the error detecting system to independently control the angle of the galvanomirror as the accurate angular displacement mechanism in the feed back control time and the two-stage tracking control system sometimes becomes unstable.

A subject of the present invention is developed to resolve the above described prior art. A purpose of the present invention is to provide an optical record reproducing device for reducing an influence of disturbance and controlling resonance frequency by a tracking control for adjusting angular error 0 by detecting a rotational displacement of the galvanomirror and increasing the hold rigidity of the galvanomirror along all directions except the rotational direction by providing the supporting member which is made of synthetic resin and has a thin wall hinge portion. Further, another purpose of the present invention is to adjust a characteristic of the whole control system to a preferable characteristic by controlling the tracking error signal in feed back control and further by detecting the rotational displacement of the galvanomirror and inputing its data to the rough position displacement mechanism and the accurate angular displacement mechanism.

SUMMARY OF THE INVENTION

To accomplish the above purpose, the first structure of the present invention is an optical record reproducing device comprising a movable optical system for moving along a radius direction of an optical disc, a separated optical system having a light source and a fixed optical system separated from the light source and a tracking control system having a reflective mirror for reflecting a laser beam irradiated from the light source toward the movable optical system and an accurate angular displacement mechanism, wherein the device is characterized of the tracking control system comprising an angular displacement detecting means for detecting an angular displacement of the reflective mirror.

Therein, it is preferable that the angular displacement detecting means detects the angular displacement from a parallel direction or perpendicular direction with respect to a rotational axis of the accurate angular displacement mechanism.

To accomplish the above purpose, the second structure of the present invention is an optical record reproducing device comprising a movable optical system for moving along a radius direction of an optical disc, a separated optical system having a light source and a fixed optical system separated from the light source and a tracking control system having a reflective mirror for reflecting a laser beam irradiated from the light source to the movable optical system and an accurate angular displacement mechanism, wherein a characteristic of the device is a supporting mechanism for supporting said reflective mirror, the supporting mechnism comprises a supporting member made of resin and a supporting base and the supporting member has a thin wall hinge portion at a middle portion, an end portion fixed at the supporting base and a front end portion attached to the reflective mirror.

Therein, it is preferable that the supporting member is insert formed at the supporting base or integrally formed with the supporting base.

Further, it is preferable that the tracking control system comprises an error detecting means for detecting error between a control target input and a control output, a reflective mirror for reflecting a laser beam irradiated from the light source toward the movable optical system, an accurate angular displacement mechanism for accurately displacing an angle of the reflective mirror, an accurate angular displacement mechanism driving circuit for driving the accurate angular displacement mechanism, an angular displacement detecting means for detecting angular displacement of the reflective mirror, a rough position displacement mechanism for moving the movable optical system along a radius direction of the optical disc, a rough position displacement mechanism driving circuit for driving the rough position displacement mechanism, a signal transmitting means for transmitting a signal from the error detecting means to the accurate angular displacement mechanism driving circuit, a signal transmitting means for transmitting a signal from the accurate angular displacement mechanism driving circuit to the accurate angular displacement mechanism, a signal transmitting means for transmitting a signal from the angular displacement detecting means to the rough position displacement mechanism driving circuit and a signal transmitting means for transmitting a signal from the rough position displacement mechanism driving circuit to the rough position displacement mechanism.

Further, it is preferable that the tracking control system comprises an error detecting means for detecting error between control target input and control output, a reflective mirror for reflecting a laser beam irradiated from the light source to the movable optical system, an accurate angular displacement mechanism for accurately displacing an angle of the reflective mirror, an accurate angular displacement mechanism driving circuit for driving the accurate angular displacement mechanism, an angular displacement detecting means for detecting angular displacement of the accurate angular displacement mechanism, a rough position displacement mechanism for moving the movable optical system along a radius direction of the optical disc, a rough position displacement mechanism driving circuit for driving the rough position displacement mechanism, a signal transmitting means for transmitting a signal from the error detecting means to the accurate angular displacement mechanism driving circuit, a signal transmitting means for transmitting a signal from the accurate angular displacement mechanism driving circuit to the accurate angular displacement mechanism, a signal transmitting means for transmitting a signal from the angular displacement detecting means to the accurate angular displacement mechanism driving circuit and a signal transmitting means for transmitting a signal from the angular displacement detecting means to the rough position displacement mechanism driving circuit and a signal transmitting means for transmitting a signal from the rough position displacement mechanism driving circuit to the rough position displacement mechanism.

Therein, it is preferable that the signal transmitting means for transmitting a signal from the angular displacement detecting means to the accurate angular displacement mechanism driving circuit is a signal transmitting means for transmitting a signal of which frequency is selected.

It is possible to adjust the angular error 0 between the direction C of moving the movable optical system and the reflective direction of the laser beam of the reflective mirror at a mechanical neutral point along the rotational direction of the galvanomirror, which is caused by dispersion of used parts and adjusting error in an assembling operation, by providing the angular displacement detecting means for detecting the rotational angle of the galvanomirror and track controlling by reading the rotational displacement from the angular displacement detecting means. It is possible to adjust larger angular error caused by an enviromental condition change and spending time.

In the supporting mechanism for supporting the galvanomirror, the galvanomirror is fixed at the supporting base via a supporting member which is made of resin and has a thin wall hinge portion so that the galvanomirror is pivotally rotatable on the thin wall hinge portion. Thereby, a control performance of the galvanomirror is increased by reinforcing the hold-rigidity of the thin wall hinge portion made of resin along a whole direction except the rotational direction.

In the tracking control system for controlling a light spot, while the tracking error signal is applied to the accurate angular displacement mechanism, the angular displacement of the Galvanomirror is detected by the angular displacement detecting means and it is applied to the rough position displacement mechanism as a control signal. Thus, the two-stage tracking control system is constituted.

Further, it is possible to detect the angular displacement of the galvanomirror by the angular displacement detecting means and to provide a small loop for inputting the angular displacement to the accurate angular displacement mechanism driving circuit. The small loop is further capable of selecting its frequency. Therefore, it is possible to control frequency characteristic of the accurate angular displacement mechanism by control a characteristic of a feed-back signal by the angular displacement mechanism and to adjust a frequency characteristic of the whole tracking control system to a desired characteristic. Further, it is possible to control an angular displacement of a light spot of the accurate angular displacement mechanism in two-stage tracking control operation by providing the small loop for feeding back an angular displacement detecting signal including low frequency portion occurred at the angular displacement detecting means without damaging control band width of a whole feed back control system.

BRIEF DESCRIPTION OF THE DRAWINGS

FIG. 7 is a block diagram showing the first general structure of a tracking control system according to the present invention.

DETAILED DESCRIPTION OF THE PREFERRED EMBODIMENT

Figure 1:
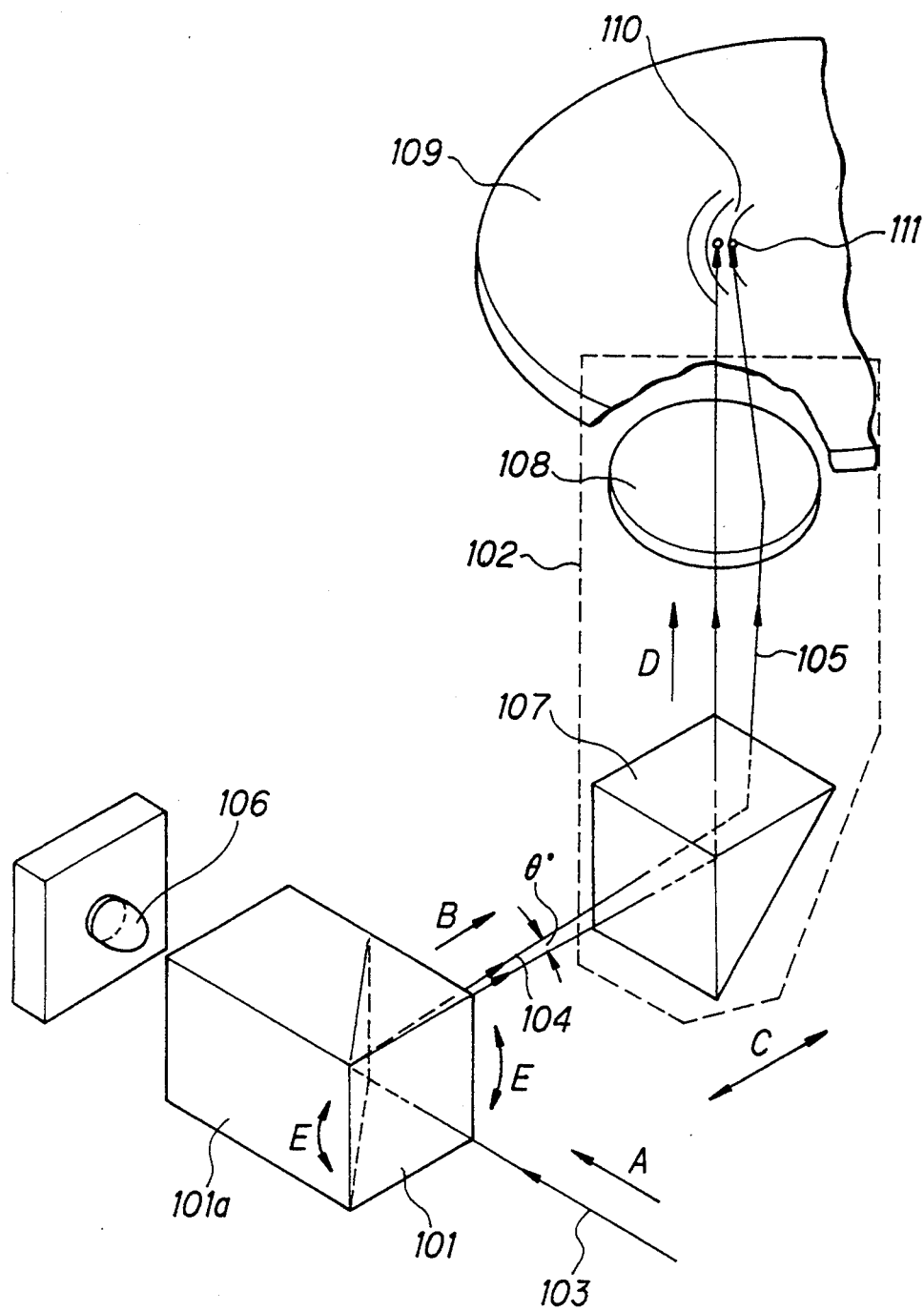
FIG. 1 is a perspective view of one embodiment of an optical record reproducing device according to the present invention with an angular displacing detecting mechanism.

It will be described the present invention with reference to embodiments as shown in the drawings.

FIG. 1 shows the first embodiment of the present invention. As shown in the drawing, in an optical record reproducing device, while a movable optical system 102 for moving an optical disc 109 along a radius direction C employs an objective lens 108 and a reflective mirror 107, a fixed optical system including a light source and a galvanomirror 101 is to be located at a position which is not relatively moved with respect to the optical disc 109. In the galvanomirror in the fixed optical system, an angle is accurately displaced by a tracking actuator. That is, the galvanomirror 101 is held with a holder 101$a$. The holder 101$a$ can be inclined or pivoted along a rotational direction E of which a rotational axis is a direction A parallel to a laser beam irradiated form the light source. As the tracking actuator, it is utilized an accurate angular displacement mechanism for accurately displacing the angular orientation of the holder 101$a$ and the galvanomirror 101 to a predetermined degree along the rotational direction E. In the embodiment, a prism is used as the galvanomirror 101 and the reflective mirror 107, respectively. At the prism, the laser beam is totally reflected.

Accordingly, a laser beam 103 irradiated from a semiconductor laser (not shown) as the light source is irradiated to the galvanomirror from a direction of an arrow A and reflected in the direction B of arrow as a laser beam 104. The laser beam 104 is reflected by the reflective mirror 107 in the movable optical system 102 and the reflected laser beam 104 is reflected toward a direction of an arrow D as a laser beam 105. The laser beam 105 is condensed by the objective lens 108 and a light spot 111 is formed on the optical disc 109 so as to be utilized for optical record reproducing. An angle of the galvanomirror 101 is accurately displaced by the accurate angular displacement mechanism and then a position of the light spot 111 is adjusted for tracking a micro displacement.

Figure 2A:
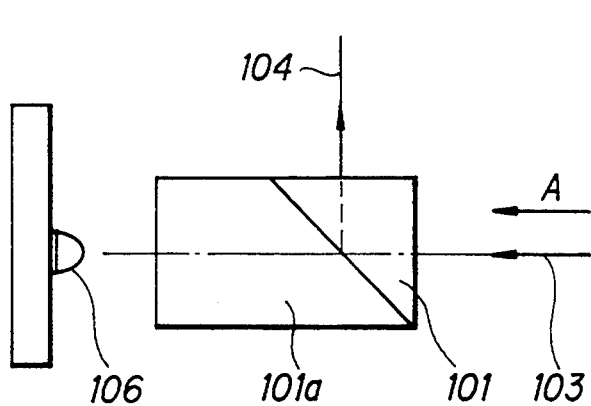
FIG. 2(a) is a plain view shownwing an arrangement of the angular displacement detecting means with respect to the galvanomirror and FIG. 2(b) is a side view of FIG. 2(a).
Figure 2B:
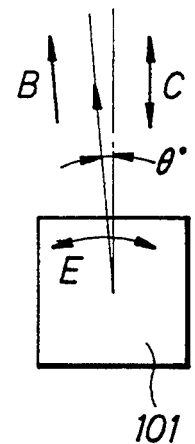

Further, a black and white pattern (not shown) is located at aside surface which is perpendicular to the rotational axis of the holder 101$a$ and an opposite side of holding the galvanomirror 101. As shown in FIGS. 2($a$) and 2($b$), an angular displacement detecting means 106 is located so as to confront the provided black and white pattern. For example, the angular displacement detecting means 106 may have a light emitting member and two divided light receiving sensor. AR LED or the like is used as the light emitting member. If the light emitting member has directivity, errors of reading signal are reduced. Accordingly, a light beam irradiated from the light emitting member of the angular displacement detecting member 108 is irradiated on the surface of the black and white pattern of the holder 101$a$ and two divided light receiving sensor of the angular displacement detecting means 106 receives a reflected light so that an angular displacement of the galvanomirror 101 is detected. A metalic Glossy surface, a surface treated glossy surface or a mirror can be used as the reflective surface of the holder 101$a$.

Figure 3A:
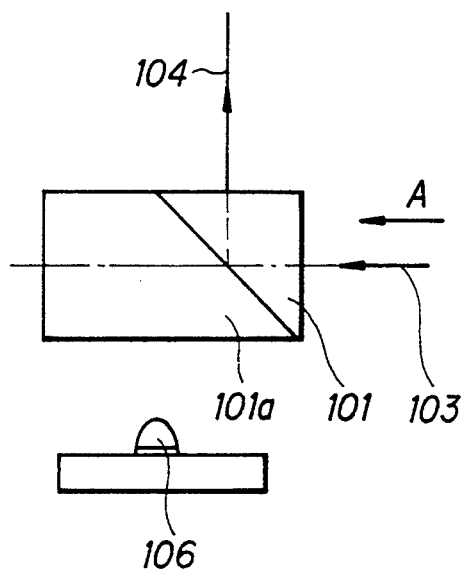
FIG. 3(a) is a plain view showing other arrangement of the angular displacement detecting means with respect of the galvanomirror and FIG. 3(b) is a side view of FIG. 3(a).
Figure 3B:
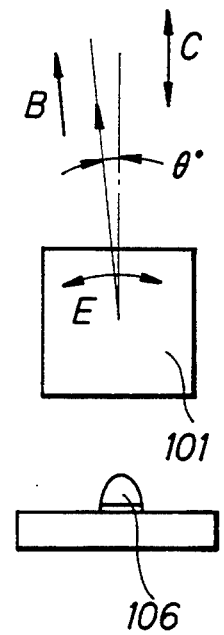

In FIGS. 2($a$) and 2($b$), although the angular displacement detecting means 106 is to be located at a position perpendicular to the rotational axis of the holder 101$a$, a location of the angular displacement detecting means 106 is not restricted according to the present invention. As shown in FIGS. 3($a$) and 3($b$), the angular displacement detecting means 106 may be located in a plane parallel to the rotational axis of the holder 101$a$. Under the above structure, a rotational angle of the galvanomirror 101 can be detected by finding a difference of reflected light amount received at the two divided light receiving sensor of the angular displacement detecting means 106 by irradiating the light beam from the light emitting member of the angular displacement detecting means 106 to a surface of the holder 101$a$.

The angular displacement detecting means can exclude the light emitting member and include only the light receiving sensor.

Figure 4:
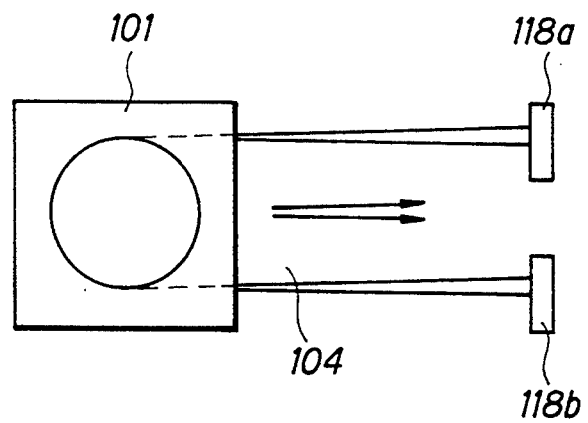
FIG. 4 shows a plain view shownwing other structure of an angular displacement detecting means.

For example, one embodiment is shown in FIG. 4. Light receiving sensors 118$a$, 118$b$ are located at an upper limit portion and a lower limit portion of a passing course of the laser beam 104 reflected from the galvanomirror 101, respectively. The angular displacement of the galvanomirror 101 may be detected by determining a difference of light amount of the laser beam 104 between the light receiving sensor 118$a$, 118$b$. An accuracy of detecting rotational angle of the galvanomirror 101 can be further increased, if the light receiving sensors 118$a$ and 118$b$ is located at a upper lone and a lower line of the passing course, respectively and are always received the laser beam by the respective light receiving sensor 118$a$, 118$b$ and the laser beam 104 is moved within a range between two receiving sensors.

By providing the angular displacement detecting means, an angular error occurred by crossing the moving direction C of the movable optical system 102 and the reflective direction B at a mechanical neutral point along the rotational direction of the galvanomirror 101 can be adjusted to become zero. That is, while the rotational angle of the galvanomirror is not controlled, the galvanomirror 101 is located at the mechanical neutral point along the rotational direction. When the angular error 0 occurs by crossing the moving direction C of the movable optical system and the reflective direction B of the laser beam 104 reflected at the galvanomirror as shown in FIG. 1, the neutral point for tracking control is determined by memorizing an intensity of an output signal from the angular displacement detecting means 106 or adjusting the angular error to zero.

In the embodiment having the above structure according to the present invention, an angle of the laser beam irradiated form the galvanomirror can be detected accurately without contacting any parts by providing the angular displacement detecting means 106 for detecting the rotational displacement of the galvanomirror which is displaced by the accurate angular displacement mechanism. In a case that the galvanomirror is controlled by a signal detected by the angular displacement detecting means 106, crosstalk does not occur in a reading time and the signal is written at a predetermined position in a writing time. Accuracy degree of parts and accuracy degree for adjusting can be also reduced, so that a cost of parts can be reduced.

In the above embodiment, although the angular displacement detecting means 106 is formed by the light emitting member and a two divided sensor which are integrally formed, these may be separated. Further, it is considerable a mechanism in which a sensor or a light emitting member is directly attached to the galvanomirror 101, a mechanism in which a reflected light beam is not utilized and a transmitting light beam is used, or a mechanism in which a light beam is not used, for example, a mechanism having magnets and hole elements as an angular displacement detecting means according to the present invention.

Figure 5A:
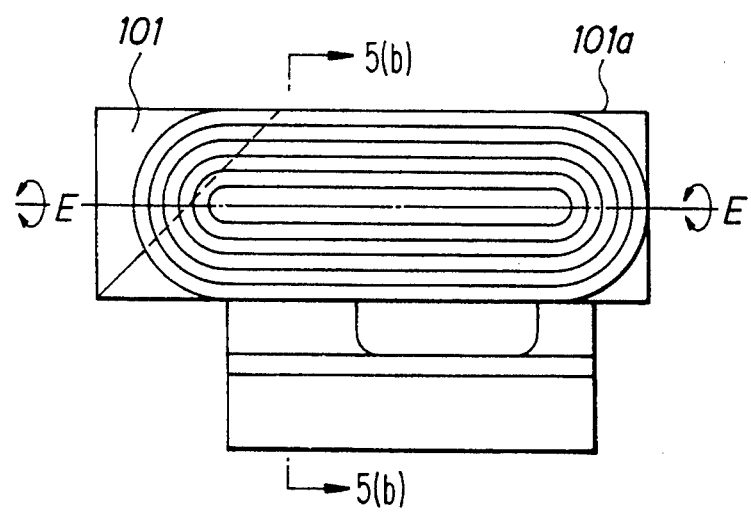
FIG. 5(a) is a plain view showing a galvanomirror supporting mechanism in a insert forming type and FIG. 5(b) is a cross sectional view along p—p line in FIG. 5(a).
Figure 5B:
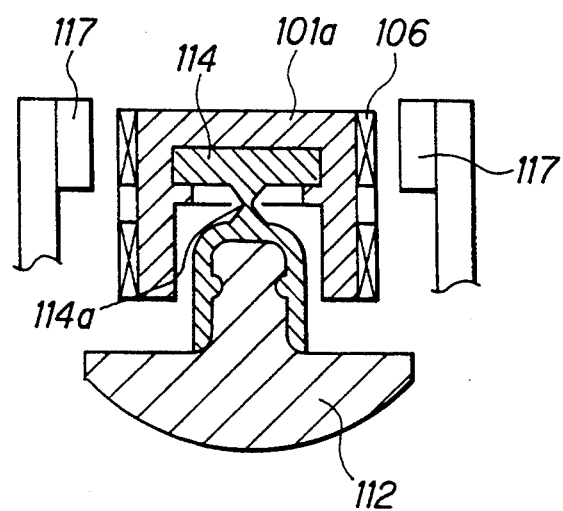

A supporting mechanism for the galvanomirror 101 and the holder 101a are now discussed with reference to FIGS. 5(a) and 5(b). As shown in the drawings, the galvamirror 101 is held with the holder 101a and the holder 101a is attached at a front end portion of the supporting member 114. The supporting member 114 is made of resin and a base end portion thereof is insert formed at a protoruded portion of a supporting base 112. The supporting member 114 has a thin wall hinge portion 114a at a middle portion which is bendable. At the both sides of the holder 101a, coils 116 are attached, respectively and a magnet 117 is located outside of each coil 116 with a predetermined interval.

Figure 20:
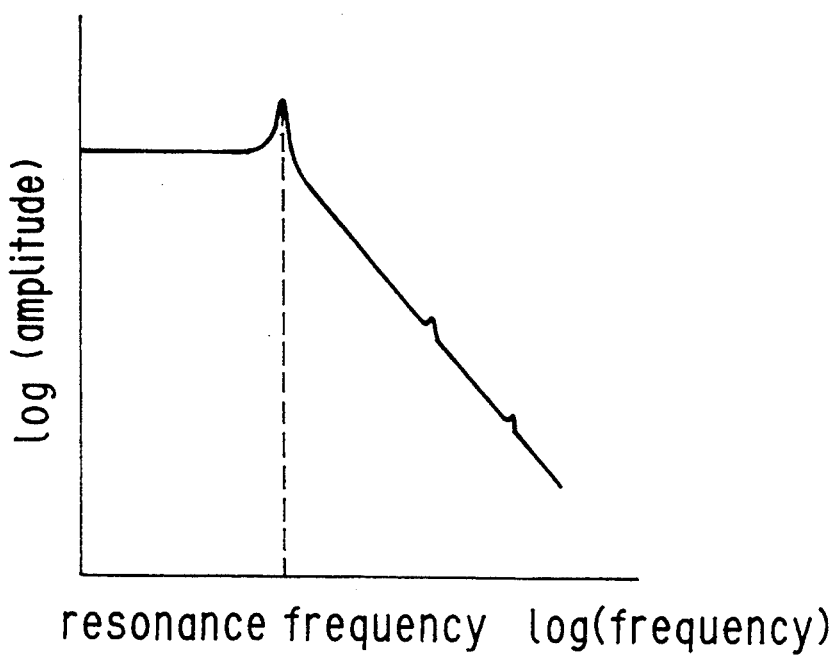
FIG. 20 shows a frequency characteristic of vibrational frequency of a conventional galvanomirror.
Figure 21:
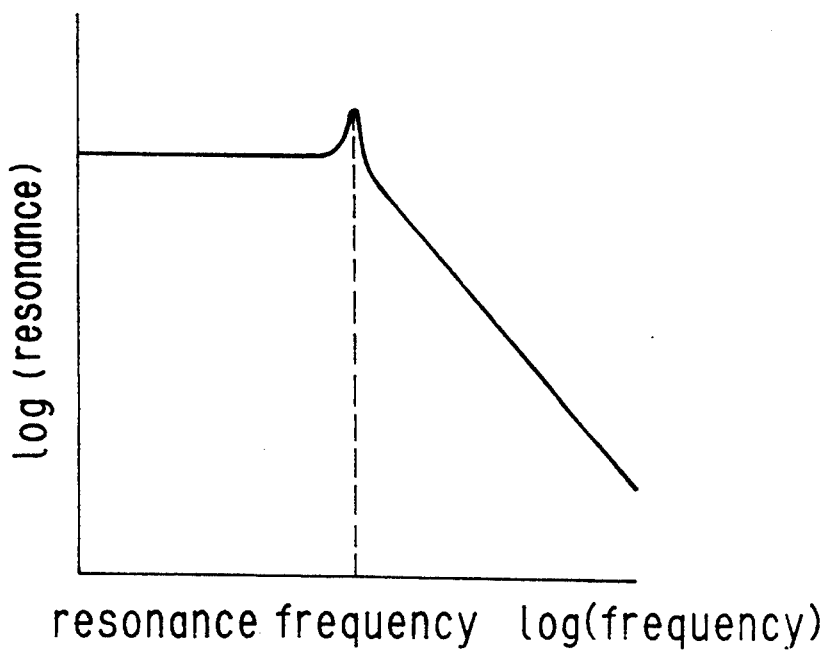
FIG. 21 shows a frequency characteristic of vibrational frequency of a galvanomirror according to the present invention.
Figure 22:
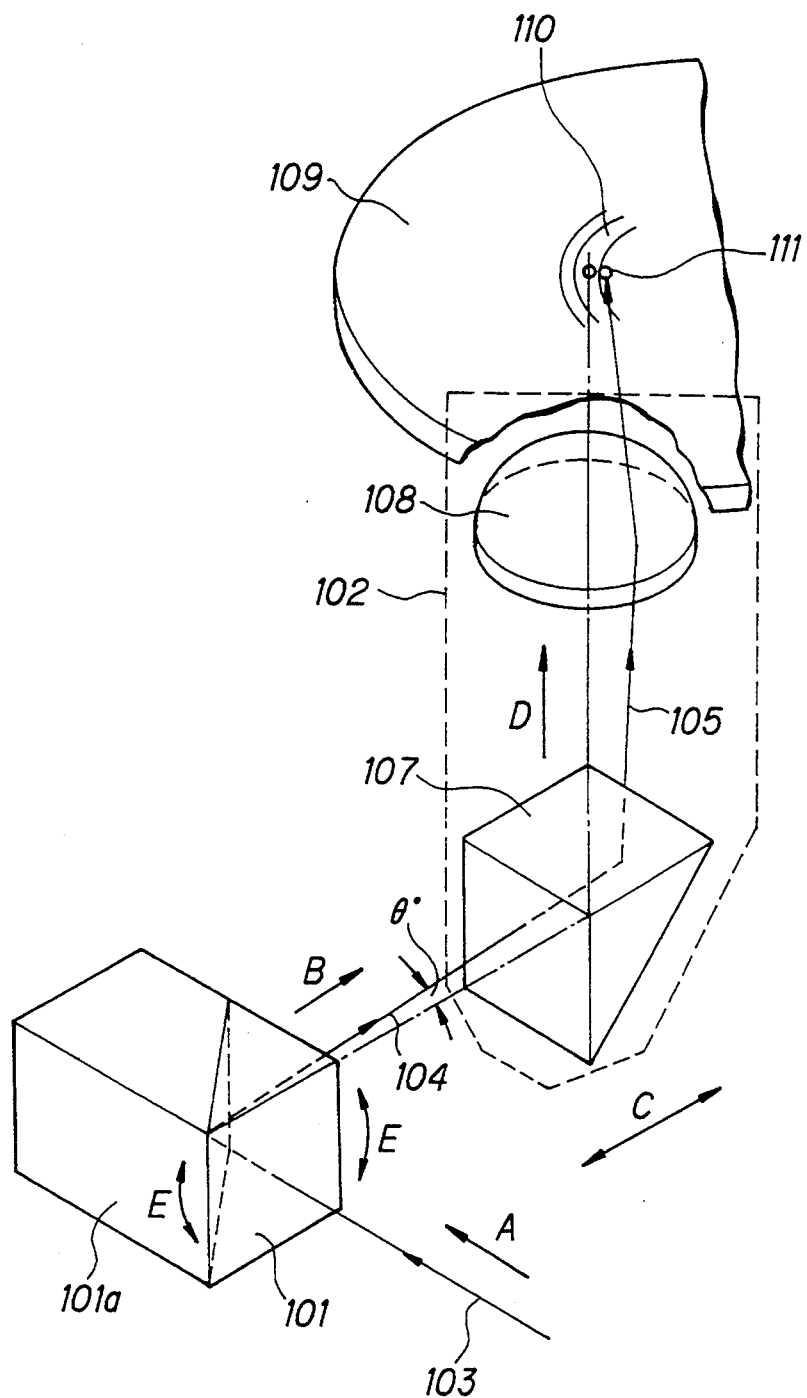
FIG. 22 is a perspective view showing a conventional optical record reproducing device.
Figure 23A:
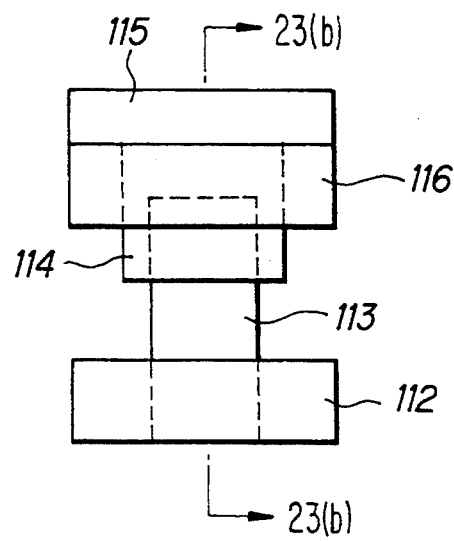
FIG. 23($a$) is a plane view showing a supporting mechanism of a conventional galvanomirror and FIG. 23($b$) is a cross sectional view along a r—r line in FIG. 23($a$).
Figure 23B:
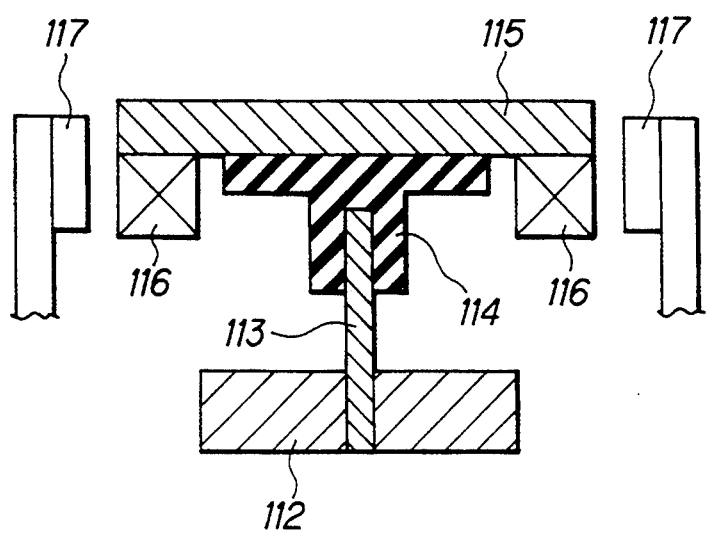

Accordingly, the galvenomirror 101 is rotatable along the rotational direction E pivoted on a rotational axis of the thin wall hinge portion 114a of the supporting member 114 by a magnetic force produced between each magnet 117 and a corresponding electrically conducted coil 116 beside the magnet 117. The stability of the rotational movement of the galvanomirror is increased by arranging the center of gravity of a member including the galvanomirror 101, the holder 101a and the coils along the rotational axis. In the conventional device as shown in FIGS. 23(a) and 23(b), although the supporting member 114 is made of rubber, in the embodiment according to the present invention, the supporting member 114 may made of resin, so that a hold-rigidity is enforced all directions except a rotational direction and the device is not apt to be influenced by disturbance. FIG. 21 shows a frequency characteristic of a frequency band of the galvanomirror 101 of the embodiment according to the present invention. FIG. 20 shows a frequency characteristic of a frequency band of the galvanomirror 101 of the conventional embodiment. Upon comparing the both characteristics, the resonance frequency of the present invention is higher so that the resonance frequency can be controlled easily.

Figure 6A:
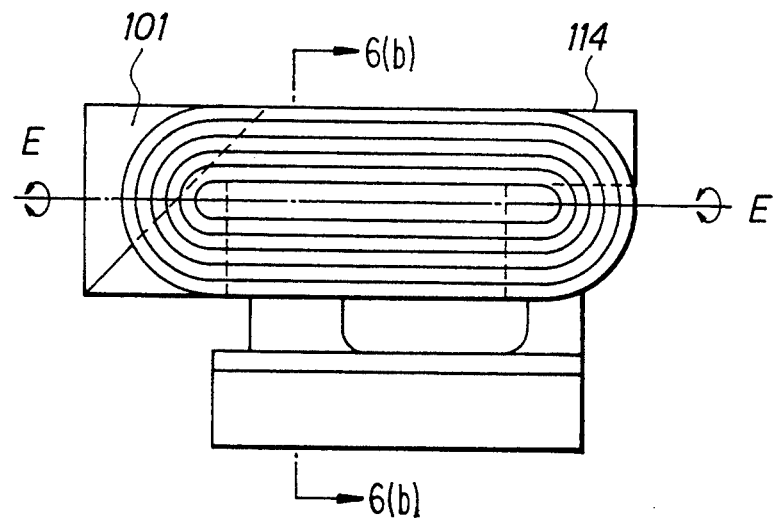
FIG. 6(a) is a plane view showing a galvanomirror supporting mechanism in a integrally forming type and FIG. 6(b) is a cross section view along a line q—q in FIG. 6(a).
Figure 6B:
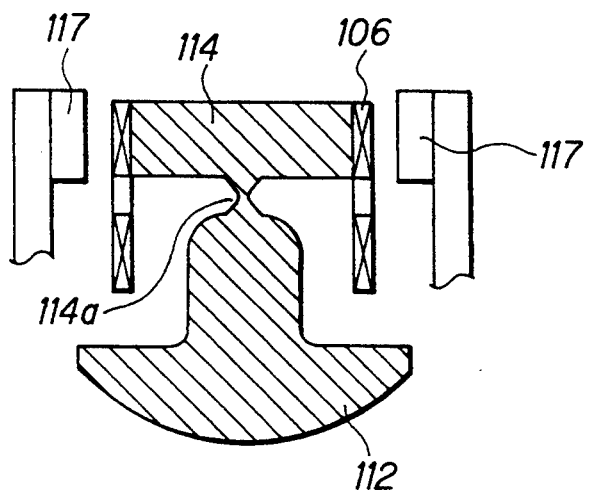

In the above embodiment, an assembling step can be simplified by insert forming the supporting member 114 at the supporting base 112. Further, as shown in FIGS. 6(a) and 6(b), a number of used parts can be reduced and the assembling step can be further simplified by integrally forming the supporting member 114 and the supporting base 112.

Figure 8:
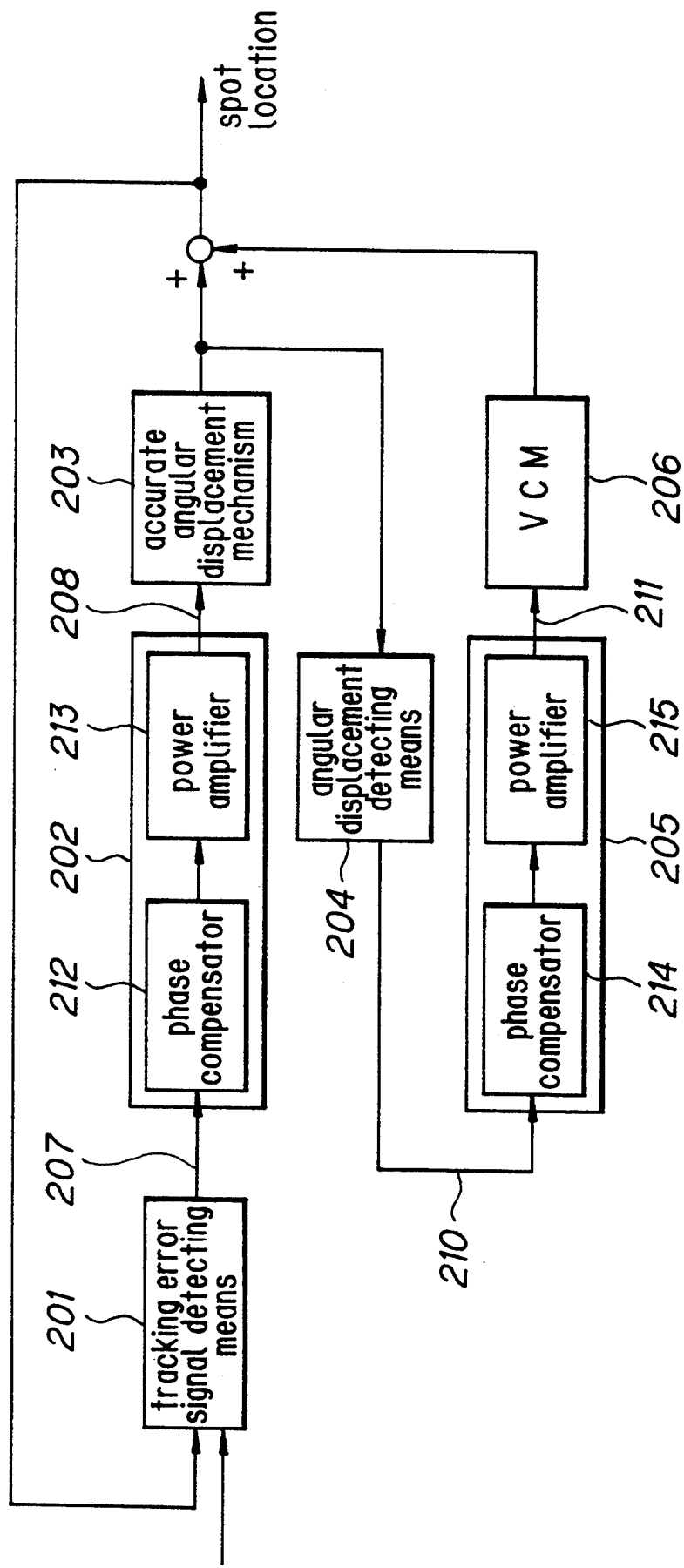
FIG. 8 is a block diagram shownwing an embodiment of the tracking embodiment as shown in FIG. 7.

A tracking control system of the present invention will be explained with reference to FIGS. 7 and 8. The tracking control system of the present invention utilizes an angular displacement detecting means 204 in two-stage tracking control. FIG. 7 is a block diagram showing a general operation of the present invention. FIG. 8 shows a structure of the embodiment of a diagram as shown in FIG. 7. As shown in the both drawings, a control target input signal is input to a tracking error signal detecting means 201 as a error detecting means together with a control output signal. The tracking error signal detecting means 201 detects the tracking error signal as its error and outputs a control signal 207. An accurate angular displacement mechanism driving circuit 202 is formed by a phase compensator 212 and a power amplifier 213. The control signal 207 is input to the accurate angular displacement mechanism driving circuit 202. An accurate angular displacement mechanism 203 for accurately displacing an angle of the galvanomirror is driven by an output signal 208 from the accurate angular displacement mechanism driving circuit 202. An angular displacement of the accurate angular displacement mechanism 203 is a part of the control output.

Further, in the present invention, an amount of the angular displacement of the galvenomirror of the accurate angular displacement mechanism 203 is detected by an angular displacement detecting means 204. A detecting signal detected by the angular displacement detecting means 204 becomes an input signal 210 of a rough position displacement mechanism driving circuit 208 for moving the movable optical system along a radius direction of the optical disc. An output signal of the rough position displacement mechanism driving circuit 205 is input to a VCM 208 as the rough position displacement mechanism. The rough position displacement mechanism driving circuit 205 is formed of a phase compensator 214 and a power amplifier 215. A signal input to the phase compensator is the detecting signal 210. The VCM 206 is driven by the power amplifier 215. As shown in FIGS. 7 and 8, a control output of the VCM 208 is added to a control output of the tracking control system as a position output. Accordingly, a displacement of the light spot as the control output of the tracking control system is obtained as a sum of a displacement of the galvanomirror 203 as the accurate angular displacement and a displacement of the VCM 206 as the rough position displacement mechanism.

In the tracking control system having the above structure according to the present invention, it is different from a conventional two-stage tracking control, it is unnecessary to use a filter which is equivalent of a filter of a distributor for a tracking error signal or the rough angular displacement mechanism. Therefore, comparing the conventional two-stage tracking control with that of the present invention, a circuit structure of the present invnetion becomes more simplified. In the prior art, while equivalent filters are used, an actual movement of the galvanomirror is not measured. And it is supposed that the galvanomirror is correctly moved in accordance with an applied signal. On the other hand, in the embodiment of the present invention, the control system is operated for adjusting an actual movement of the galvanomirror by employing the angular displacement detecting mechanism so that an operation of the embodiment according to the present invention becomes stable.

Figure 9:
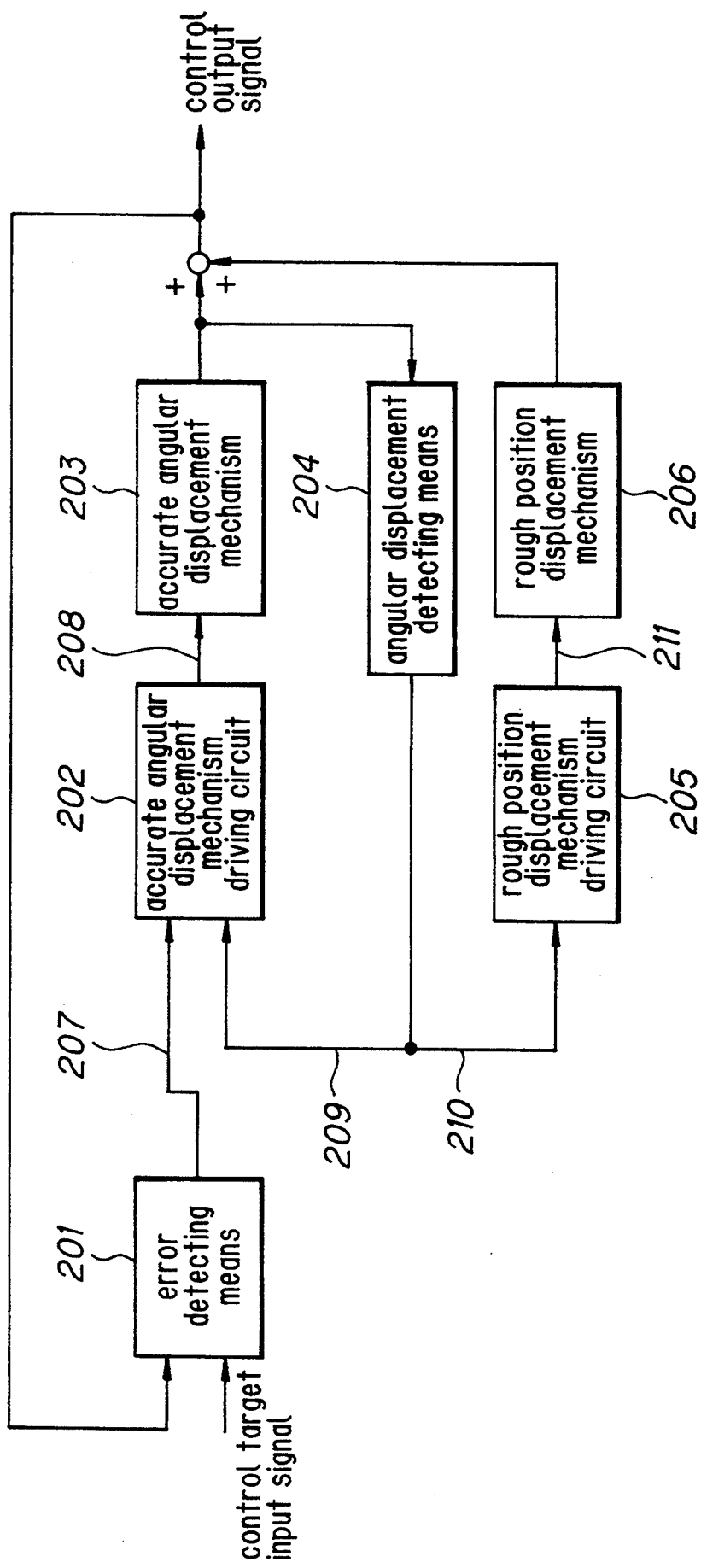
FIG. 9 is a block diagram showing the second general structure of a tracking control system according to the present invention.
Figure 10:
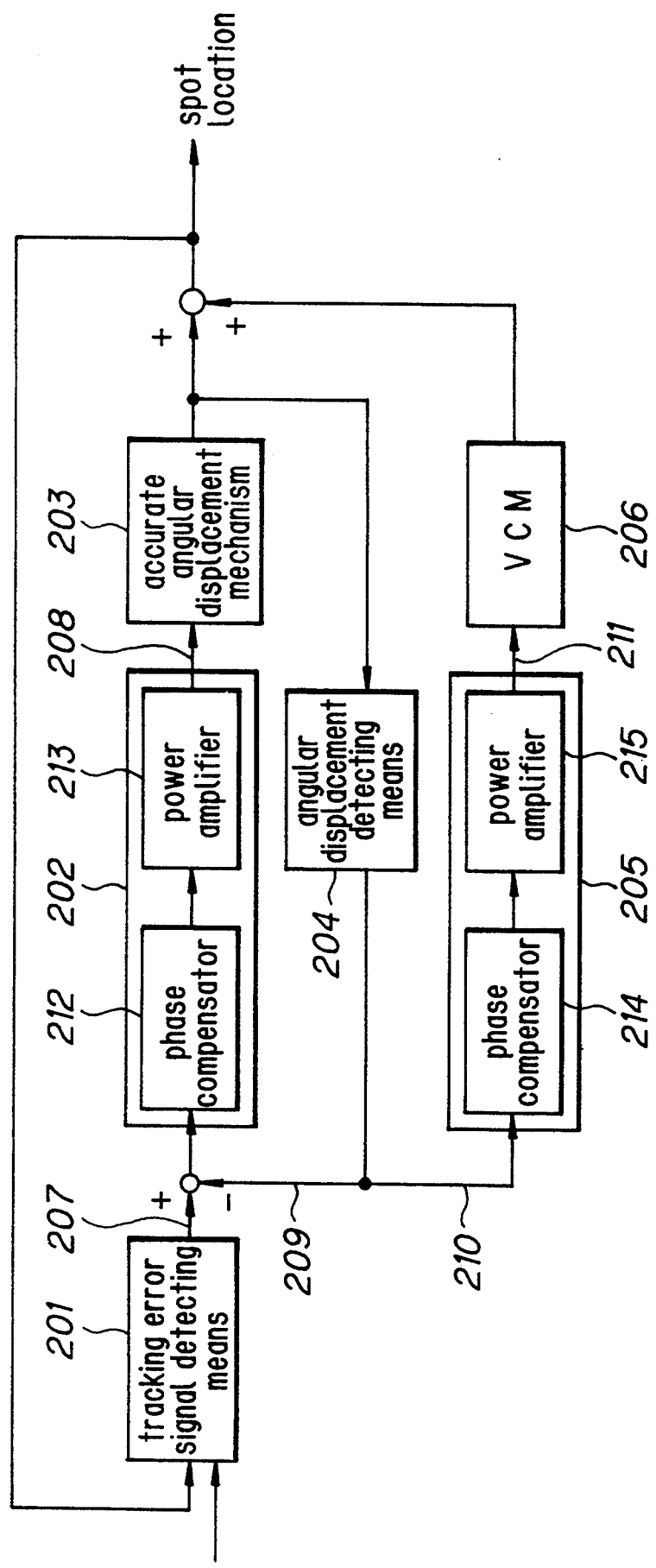
FIG. 10 is a block diagram, showing an embodiment of the tracking embodiment as shown in FIG. 9.

The other structure of the tracking control system will be explained with reference to FIGS. 9 and 10. In the tracking control system of the embodiment, a detecting signal detected from the angular displacement detecting means 204 is treated as an input signal 210 to the rough position displacement mechanism driving circuit 208 and a small loop is further formed so as to treat an input signal 209 to the rough position displacement mechanism 202. FIG. 9 is a block diagram showing a general operation of the present invention. FIG. 10 is a structure of the block diagram as shown in FIG. 9. As shown in the both drawings, a control target input signal is input to the tracking error signal detecting means 201 as the error detecting means together with a control output signal. The tracking error signal detecting means 201 detects a tracking error signal as its error and outputs a control signal 207. The rough angular displacement mechanism driving circuit 202 is formed of the phase compensator 212 and a power amplifier 213. The control signal 207 is input to the rough angular displacement mechanism driving circuit 202 and the angular displacement detecting signal 209 of the accurate angular displacement mechanism is input by the small loop. The accurate angular displacement mechanism 203 for accurately displacing an angle fo the galvanomirror is driven by the output signal 208 of the accurate angular displacement mechanism driving circuit 202. An angular displacement of the accurate angular displacement mechanism 203 becomes a part of the control output.

Further, in the present invention, an amount of the angular displacement of the galvenomirror of the accurate angular displacement mechanism 203 is detected by an angular displacement detecting means 204. A detecting signal detected by the angular displacement detecting means 204 becomes an input signal 210 of a rough position displacement mechanism driving circuit 205 for moving the movable optical system along a radius direction of the optical disc. Further, the detecting signal is treated as an input signal 209 to the accurate angular displacement mechanism driving circuit 202 by the small loop. An output signal of the rough position displacement mechanism driving circuit 205 is input to the VCM 206 as the rough position displacement mechanism. The rough position displacement driving circuit 205 is formed of a phase compensator 214 and a power amplifier 215. A signal input to the phase compensator is the detecting signal 210. The VCM 206 is driven by the power amplifier 215. As shown in FIGS. 9 and 10, a control output of the VCM 206 is added to a control output of the tracking control system as a position output. Accordingly, a displacement of the light spot as the control output of the tracking control system is obtained as a sum of a displacement of the galvanomirror 203 as the accurate angular displacement and a displacement of the VCM 206 as the rough position displacement mechanism.

In the embodiment having the above structure according to the present invention, a detecting signal of the angular displacement detecting means 204 is input as an input signal 208 to the accurate angular displacement mechanism driving circuit 202 by the small loop. Upon comparing an embodiment without having a small loop and the embodiment having the small loop, the embodiment having the small loop has a merit which a band width corresponding to an open-loop response becomes wider as shown a gain characteristic and a phase characteristic in FIGS. 17(a) and 17(b).

Figure 17A:
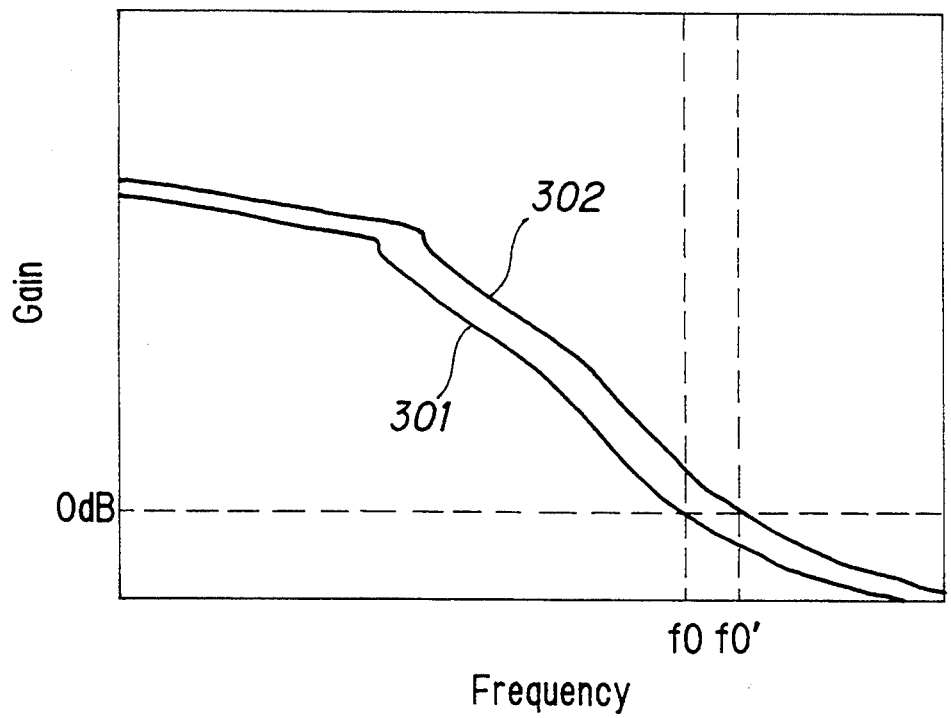
FIG. 17($a$) is a graph showing a relation between frequency and gain and FIG. 17($b$) is a graph showing a relation between frequency and phase.
Figure 17B:
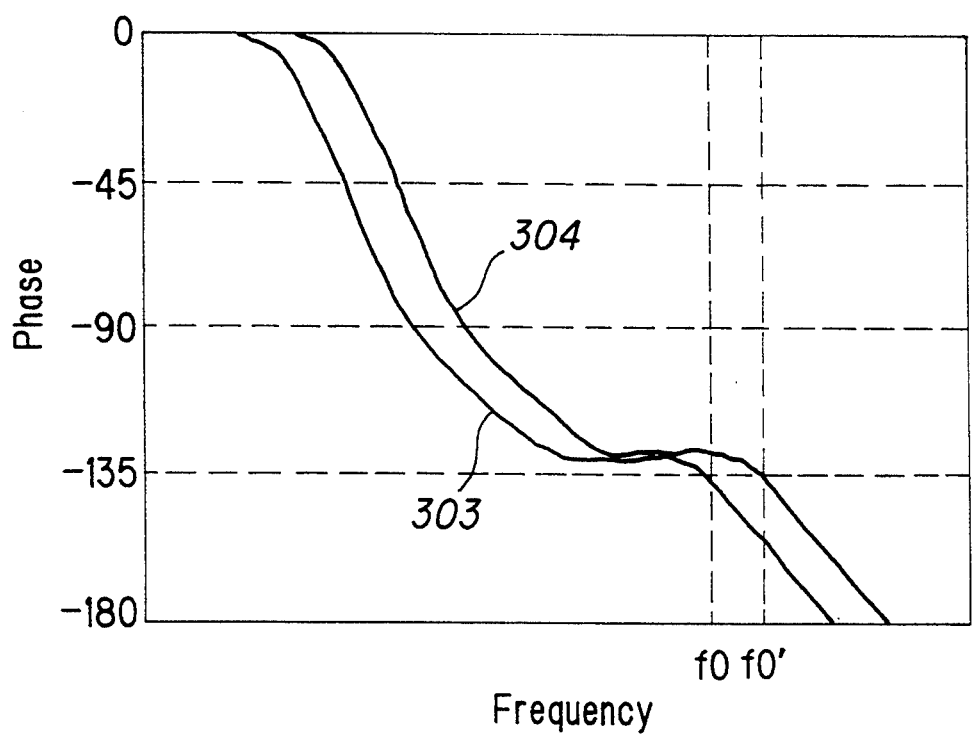

That is, in a diagram 301 as shown in FIG. 17(a) and a diagram 303 as shown in FIG. 17(b), a detecting signal 208 of the phase detecting means 204 is not input to the accurate angular displacement mechanism driving circuit 202. That is, it shows an open-loop frequency characteristic of a whole system without having the small loop. In a diagram 302 as shown in FIG. 17(a) and the a diagram 304 as shown in FIG. 17(b) shows an open-loop frequency characteristic of the whole control system in a case that a detecting signal 209 is input to the accurate angular displacement mechanism driving circuit 202.

As clearly shown in the drawings, a frequency f0' of which phase margin is 45° in case of feeding back the detecting signal to the accurate angular displacement mechanism driving circuit 202 in the diagrams 302 and 304 in the embodiment is greater than a frequency f0 of which phase margin is 45° in case of not feeding back the detecting signal 209 to the accurate angular displacement driving circuit 202 in the diagrams 301 and 303. Accordingly, an open-loop gain of the whole system can be changed from the diagram 301 to the diagram 302 and an open-loop band width for the whole system can become wide. Thereby, upon comparing the operation and an operation without feeding back, it is possible to obtain an optical record reproducing device having a wide control frequency band width without changing the characteristics of the tracking control means.

Figure 11:
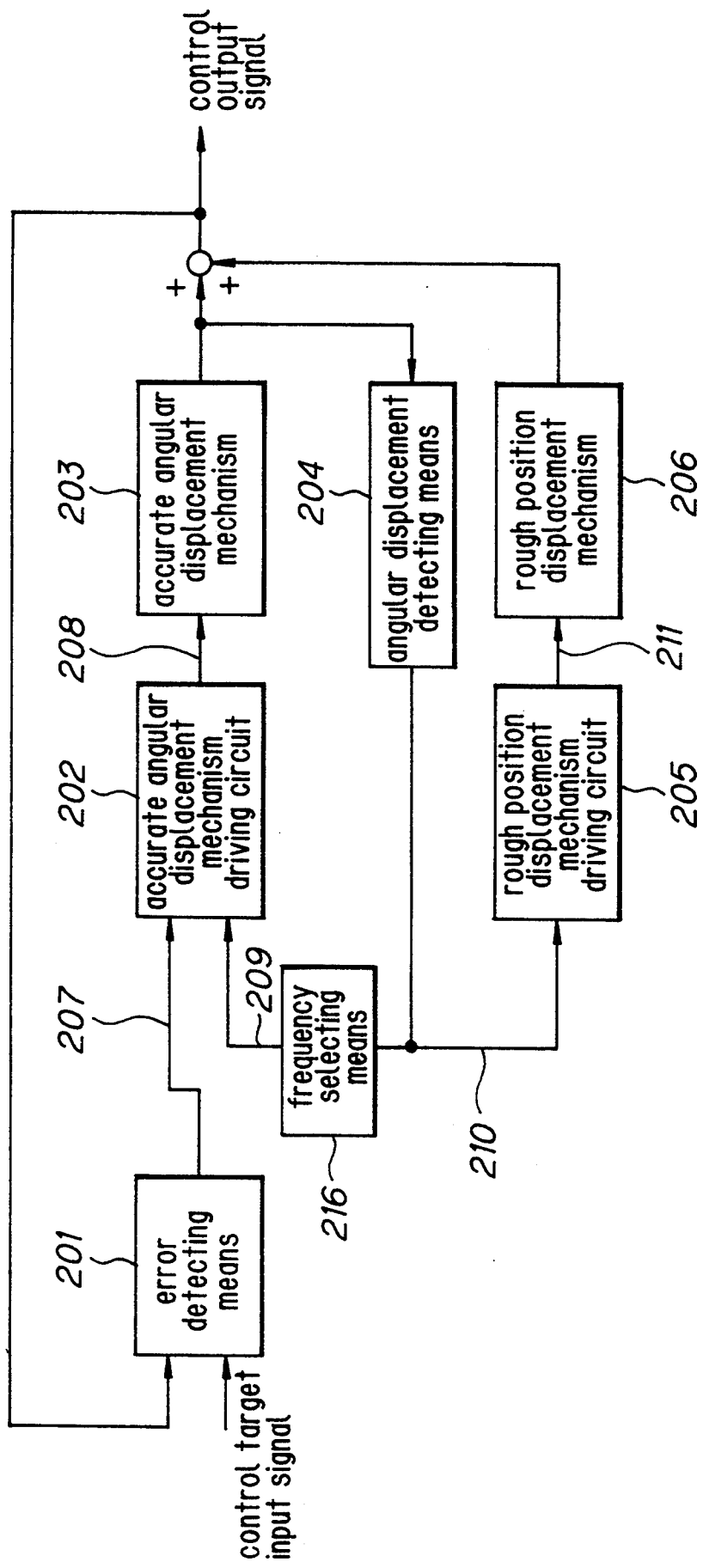
FIG. 11 shows a block diagram showing the third general structure of a tracking system according to the present invention.
Figure 12:
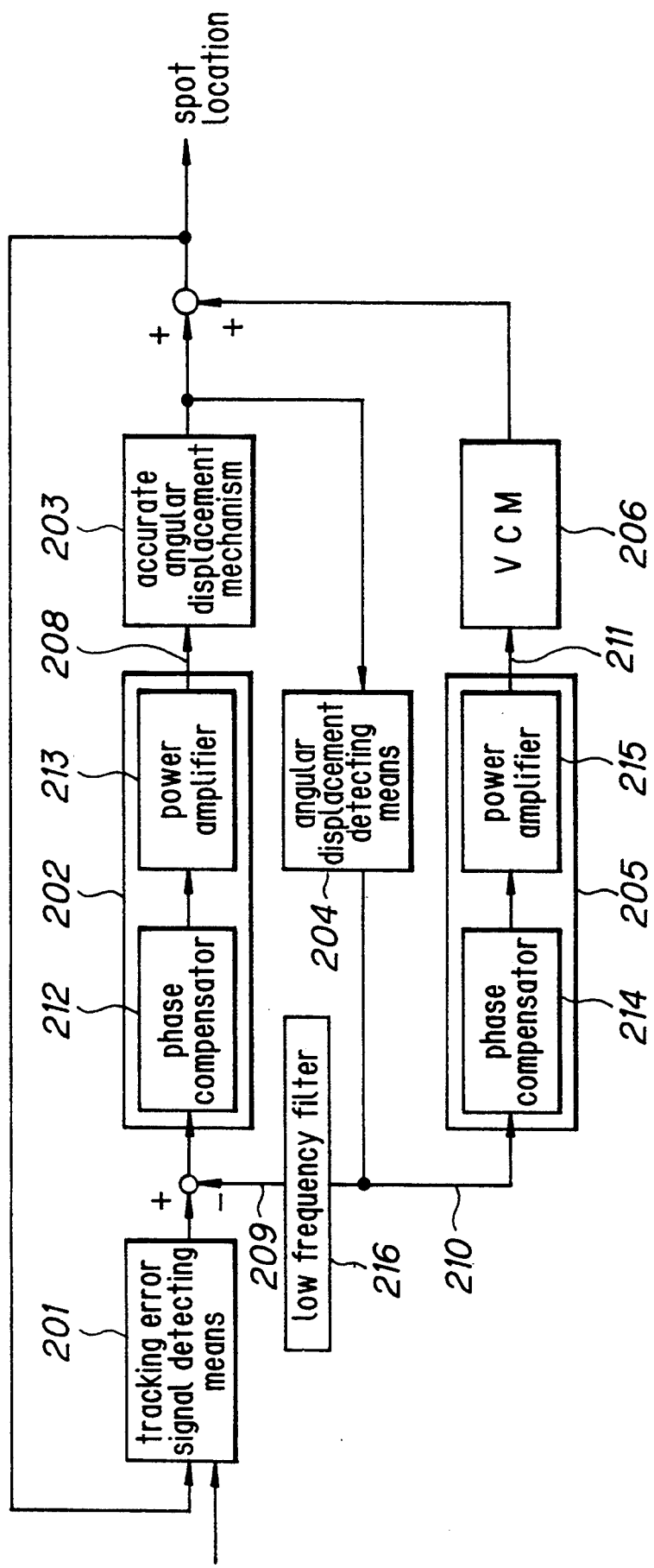
FIG. 12 is a block diagram showning an embodiment of the tracking embodiment as shown in FIG. 11.

In the next, the other structure of the tracking control system will be further explained with respect to FIGS. 11 and 12. In the tracking control system, a frequency selecting means is added in the small loop. Another structure is same to the structure as shown in FIGS. 9 and 10. FIG. 11 is a block diagram showing a general operation of the present invention and FIG. 12 is a structure of showing an embodiment as shown in FIG. 11. As shown in the both drawings, the control target input singal is input to the tracking error detecting means 201 as an error detecting means together with the control output signal. The tracking error signal detecting means 201 detects a tracking error signal as its error and outputs the control signal 207. The accurate angular displacement mechanism driving circuit 202 is formed of a phase compensator 212 and a power amplifier 213. In the accurate angular displacement mechanism driving circuit 202, the control signal 207 is input and a signal 209 of which frequency is selected by a low frequency filter 216 is input. An accurate angular displacement mechanism 203 for accurately displacing an angle of the galvanomirror is driven by the output signal 208 of the accurate angular displacement mechanism driving circuit 202. An angular displacement of the accurate angular displacement mechanism 203 becomes a part of the control output.

Further, in the present invention, an amount of the angular displacement of the galvanomirror of the accurate angular displacement mechanism 203 is detected by an angular displacement detecting means 204. A detecting signal detected by the angular displacement detecting means 204 becomes an input signal 210 of a rough position displacement mechanism driving circuit 205 for moving the movable optical system along a radius direction of the optical disc. Further, the detecting signal is treated as an input signal of which frequency is selected by a low frequency filter 218 as a frequency selecting means in the small loop and inputs to the rough angular displacement mechanism driving circuit 202. An output signal of the rough position displacement mechanism driving circuit 205 is input to VCM 206 as the rough position displacement mechanism. The rough position displacement mechanism driving circuit 205 is formed of a phase compensator 214 and a power amplifier 215. A signal input to the phase compensator is the detecting signal 210. A VCM 206 is driven by the power amplifier 215. As shown in FIGS. 9 and 10, a control output of the VCM 206 is added to a control output of the tracking control system as a position output. Accordingly, a displacement of the light spot as the control output of the tracking control system is obtained as a sum of a displacement of the galvanomirror 203 as the accurate angular displacement and a displacement of the VCM 206 as the rough position displacement mechanism.

In the embodiment having the above structure according to the present invention, at first, an output form the angular displacement detecting means 204 is feeding back by the small loop via a frequency selecting means 216 in the two-stage tracking control, so that it is possible to control an angle having a frequency characteristic desired by the accurate angular displacement mechanism 203. It is not impossible to feed back in a small loop without having the frequency selecting means as described above. Secondary, in a case that a mechanical neutral point of the accurate angular displacement mechanism 203 and a control target point is not coincident, an angle of the accurate angular displacement mechanism 203 has a predetermined error in the two-stage tracking control. In a case of feeding back in the small loop, an angle can be controlled so that an angular error of the accurate angular displacement mechanism is deleted. In a case of not feding back in the small loop, the angular error can not be deleted.

Figure 18:
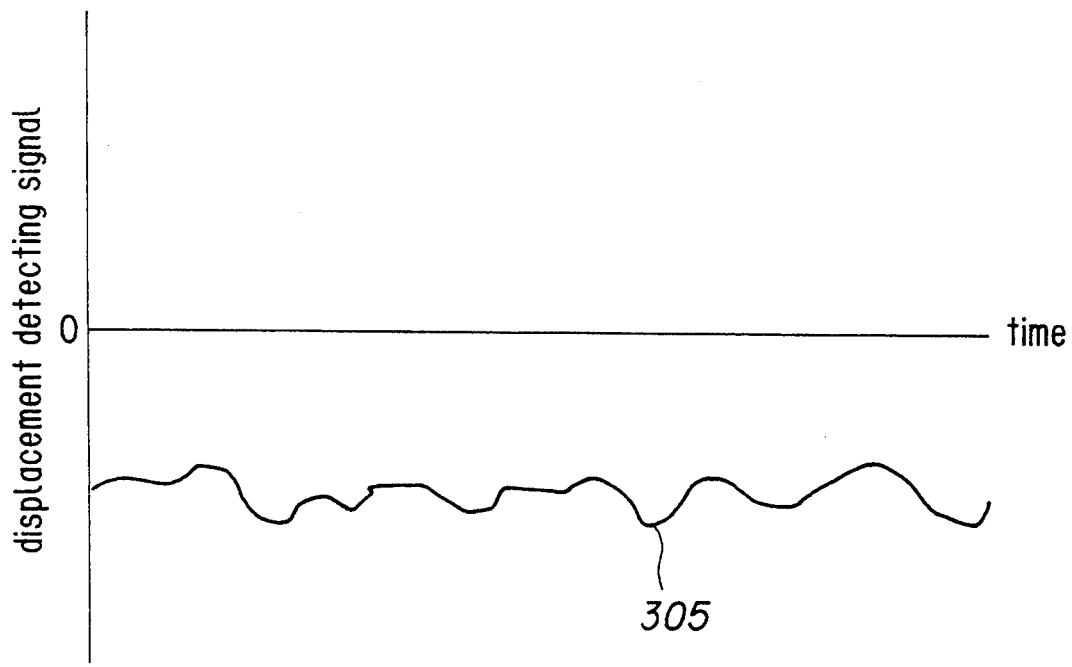
FIG. 18 is a showing a displacement detecting signal for input an angular detecting signal to an accurate angular displacement mechanism by the small loop.
Figure 19:
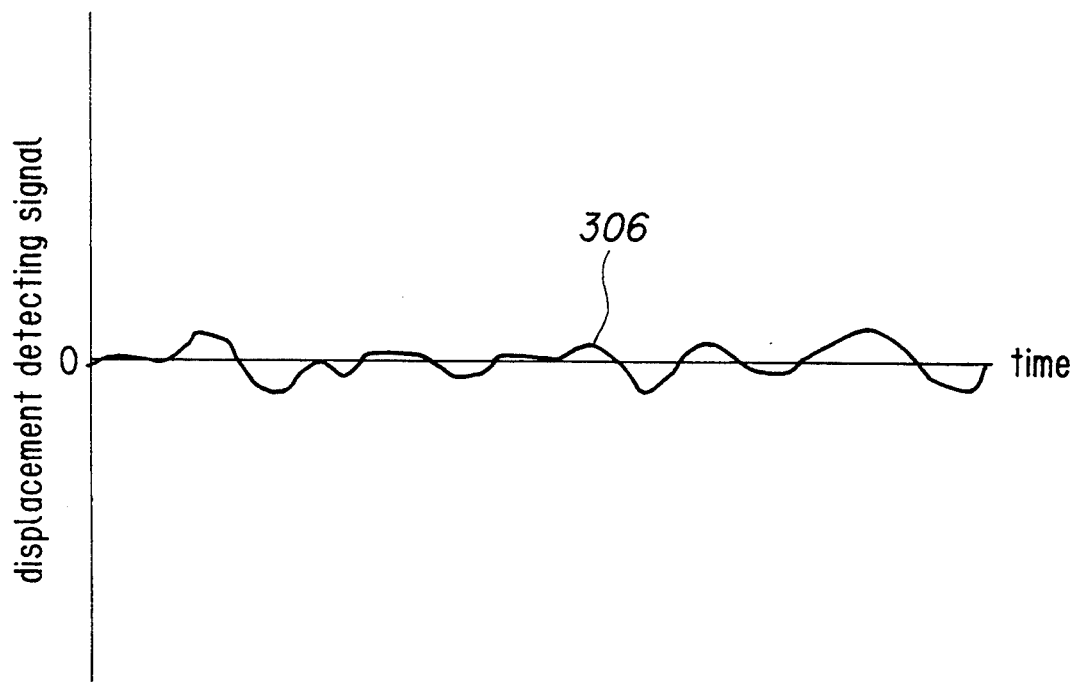
FIG. 19 is a graph showing a displacement detecting signal in case of not inputing the angular detecting signal to the accurate angular displacement mechanism by the small loop.

In a case of a two-stage tracking servo system without having a low frequency filter 216 in a diagram 305 as shown in FIG. 18, a predetermined error is produced as an angular displacement of the galvanomirror by the accurate angular displacement mechanism 202. In the diagram as shown in FIG. 19, in a case of a two-stage tracking servo having a low frequency filter 216 for selecting frequency, a predetermined error of the angular displacement of the galvanomirror is deleted by feeding back.

Figure 13:
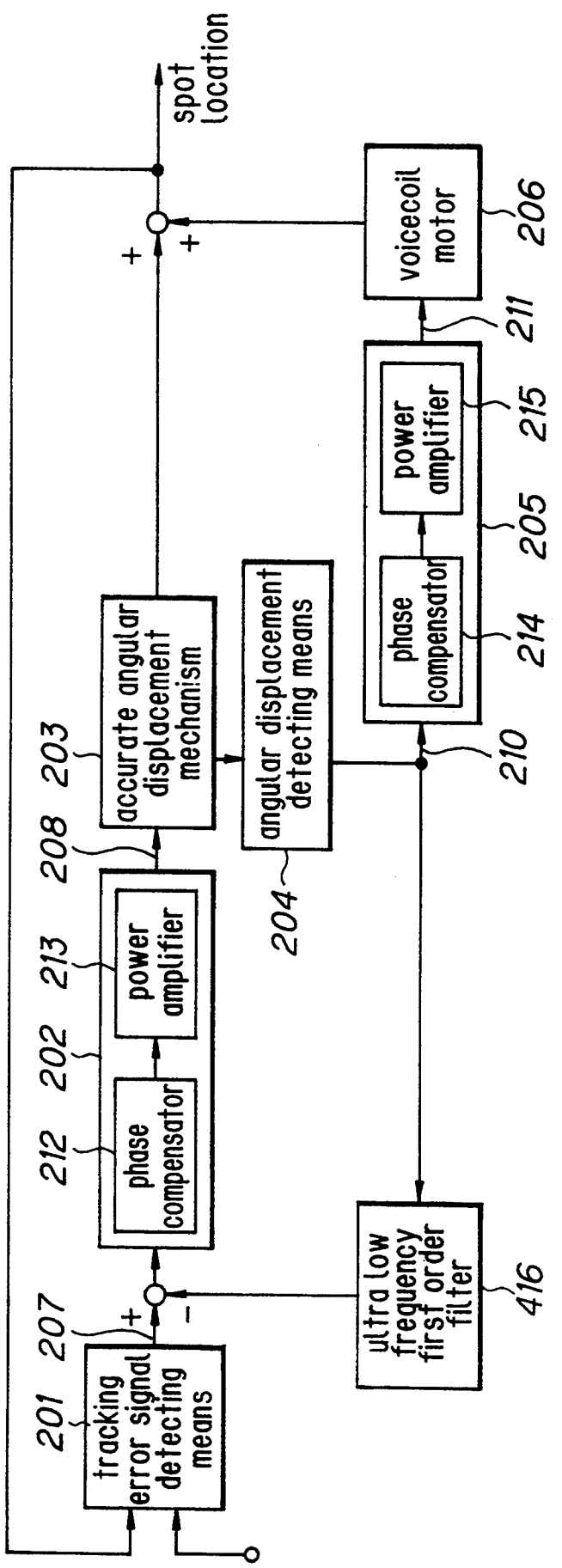
FIG. 13 is a block diagram showing the other embodiment of the tracking embodiment as shown in FIG. 11.
Figure 14:
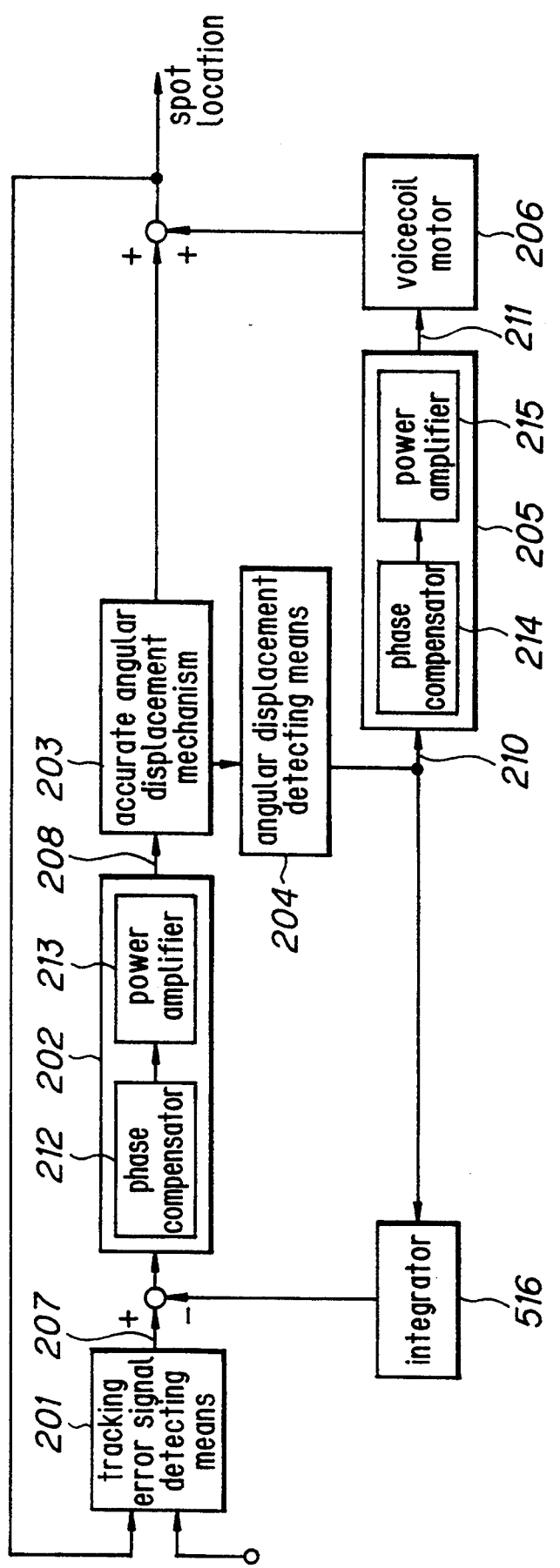
FIG. 14 is a block diagram showing the different embodiment of the tracking embodiment as shown in FIG. 11.

In the above embodiment, although the low frequency filter 216 is used as a frequency selecting means, it is not restricted in the present invention. For example, an ultra low frequency first filter 416 can be used as shown in an embodiment in FIG. 13 or an integrator 516 can be used as shown in an embodiment in FIG. 14.

Figure 15:
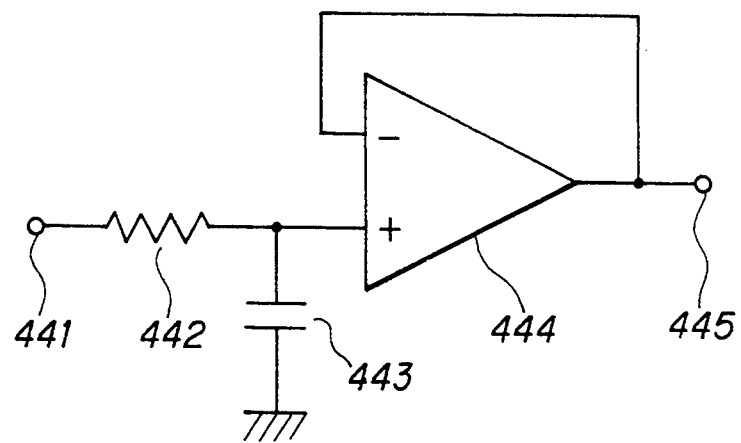
FIG. 15 shows a structure of an ultra low frequency first order filter employed in the tracking control system in FIG. 13.
Figure 16:
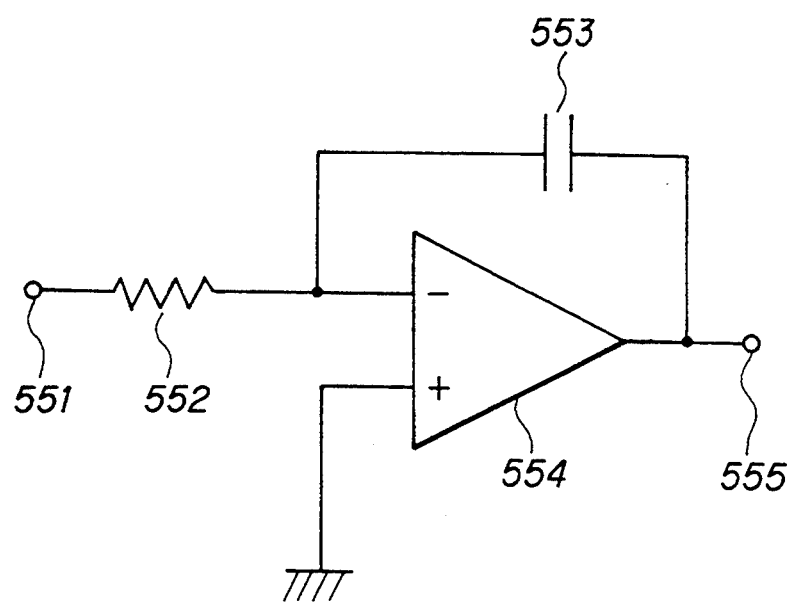
FIG. 16 shows a structure of an integrator used in the tracking control system in FIG. 14.

As shown in FIG. 15, in the ultra low frequency first filter 416, an input signal input to a terminal 441 is input to a high impedance buffer circuit formed by an operational amplifier 444 though a first order filter formed by a resistance 442 and a condensor 443. An output of the operational amplifier 444 is connected to an output terminal 448. Accordingly, in a circuit as shown in FIG. 15, the filter is actuated as a low frequency filter having a cut-off frequency determined by time constant of the resistor 442 and the condensor 443. Input impedance of the circuit input from the output terminal 445 is enough high, it is not absolutely necessary a high input impedance buffer circuit in case of not influencing upon the first order filter formed by the resistor 442 and the condensor 443.

The integrator 516 is formed by an input terminal 551, a resistor 552, a condensor 553, an operational amplifier 554 and an output terminal 555. Gain in d.c. is infinity and a phase lag thereof is 90°.

As described base on the embodiments, according to the present invention, a tacking control for adjusting angular error is operated by detecting a rotational displacement of the galvanomirror. An optical record reproducing device in which a hold-rigidity of the galvanomirror along a whole direction except a rotational direction is enforced and an influence of disturbance is reduced and a resonance is restricted by forming a supporting member made of resin and providing a thin wall. Further, according to the present invention, a number of parts is reduced and an assembling operation can be simplified by insert forming or integrally forming a supporting member and a supporting base.

We claim:
1. An optical record reproducing device comprising:
 a movable optical system, including an objective lens, which is movable along a radial direction of an optical disc; and
 a fixed optical system including a light source for irradiating a light beam, reflecting means for reflecting said light beam toward said movable optical system and attendantly onto said disc, an accurate angular displacement mechanism for angularly displacing said reflecting means so as to attendantly control the tracking of said light beam on said disk and angular detecting means for detecting the angular orientation of said reflecting means, wherein said tracking control system further comprises:
 an accurate angular displacement mechanism driving circuit for driving said accurate angular displacement mechanism;
 an angular displacement detecting means for detecting an angular displacement of said accurate angular displacement mechanism and for producing a displacement signal;
 a rough position displacement driving circuit for generating a signal in response to said displacement signal from said angular displacement detecting means;
 a rough position displacement mechanism for moving said movable optical system in accordance with said signal from said rough position displacement mechanism driving circuit;
 a difference detecting means for detecting a difference between a sum of an output signal from said accurate angular displacement mechanism and an output signal from said rough position displacement mechanism, and an input signal;
 wherein a difference between said output signal from said angular displacement detecting means and a difference of a signal from said difference detecting means is input to said accurate angular displacement mechanism driving circuit; and wherein said output signal from said angular displacement detecting means is input to a frequency selecting means and an output from said frequency selecting means is input to said accurate angular displacement mechanism driving circuit.

2. An optical record reproducing device comprising:

a movable optical system, including an objective lens, which is movable along a radial direction of an optical disc; and a fixed optical system including a light source for irradiating a light beam, a reflector for reflecting said light beam toward said movable optical system and attendantly onto said disc, an accurate angular displacement mechanism for angularly displacing said reflector so as to attendantly control the tracking of said light beam on said disk and an angular detector for detecting the angular orientation of said reflector, wherein said tracking control system further comprises:

an accurate angular displacement mechanism driving circuit for driving said accurate angular displacement mechanism;

an angular displacement detector for detecting an angular displacement of said accurate angular displacement mechanism and for producing a displacement signal;

a rough position displacement driving circuit for generating a signal in response to said displacement signal from said angular displacement detector;

a rough position displacement mechanism for moving said movable optical system in accordance with said signal from said rough position displacement mechanism driving circuit;

a difference detector for detecting a difference between a sum of an output signal from said accurate angular displacement mechanism and an output signal from said rough position displacement mechanism, and an input signal;

wherein a difference between said output signal from said angular displacement detector and a difference of a signal from said difference detector is input to said accurate angular displacement mechanism driving circuit; and wherein said output signal from said angular displacement detector is input to a frequency selector and an output from said frequency selector is input to said accurate angular displacement mechanism driving circuit.

* * * * *